US 12,036,728 B2

(12) United States Patent
Chen et al.

(10) Patent No.: US 12,036,728 B2
(45) Date of Patent: Jul. 16, 2024

(54) PAPER-BASED 3D PRINTING DEVICE AND PRINTING METHOD

(71) Applicant: SOUTH CHINA UNIVERSITY OF TECHNOLOGY, Guangzhou (CN)

(72) Inventors: Guangxue Chen, Guangzhou (CN); Ling Cai, Guangzhou (CN); Linyi Chen, Guangzhou (CN); Qifeng Chen, Guangzhou (CN); Jiangping Yuan, Guangzhou (CN); Xiaochun Wang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 500 days.

(21) Appl. No.: 17/294,395

(22) PCT Filed: Aug. 17, 2020

(86) PCT No.: PCT/CN2020/109467
§ 371 (c)(1),
(2) Date: May 15, 2021

(87) PCT Pub. No.: WO2021/032043
PCT Pub. Date: Feb. 25, 2021

(65) Prior Publication Data
US 2022/0009160 A1   Jan. 13, 2022

(30) Foreign Application Priority Data

Aug. 16, 2019   (CN) .......................... 201910762494.X

(51) Int. Cl.
*B29C 64/147*   (2017.01)
*B29C 64/188*   (2017.01)
(Continued)

(52) U.S. Cl.
CPC .......... *B29C 64/147* (2017.08); *B29C 64/188* (2017.08); *B29C 64/209* (2017.08);
(Continued)

(58) Field of Classification Search
CPC ... B29C 64/147; B29C 64/188; B29C 64/194; B29C 64/209; B29C 64/232;
(Continued)

(56) References Cited

U.S. PATENT DOCUMENTS

2005/0068364 A1* 3/2005 Kayanaka ................ B41J 2/165
347/23
2009/0321979 A1* 12/2009 Hiraide ................. B29C 64/188
264/109
(Continued)

FOREIGN PATENT DOCUMENTS

CN    101618604    1/2010
CN    104908320    9/2015
(Continued)

*Primary Examiner* — John L Goff, II
(74) *Attorney, Agent, or Firm* — Shih IP Law Group, PLLC

(57) ABSTRACT

The present invention relates to a paper-based 3D printing device and a printing method. The paper-based 3D printing device comprises a printing platform, a three-axis linkage platform, a cutting head and an inkjet head. The printing platform is used for placing paper, and the three-axis linkage platform is arranged to, firstly, drive the cutting head to cut the corresponding paper along the contour of a preset model to form a cutting seam, and then drive the inkjet head to inkjet color toward the cutting seam along the contour of the preset model. The paper-based 3D printing device and the printing method save ink, and can directly spray the ink at the cutting seam, which is equivalent to coloring the outer surface of the model, effectively improving the coloring (Continued)

effect, making the coloring of the outer surface of the model uniform, eliminating the step of printing one by one.

7 Claims, 6 Drawing Sheets

(51) Int. Cl.
| | |
|---|---|
| *B29C 64/209* | (2017.01) |
| *B29C 64/232* | (2017.01) |
| *B29C 64/236* | (2017.01) |
| *B29C 64/307* | (2017.01) |
| *B41J 3/407* | (2006.01) |
| *B33Y 10/00* | (2015.01) |
| *B33Y 30/00* | (2015.01) |
| *B33Y 40/00* | (2020.01) |

(52) U.S. Cl.
CPC .......... *B29C 64/232* (2017.08); *B29C 64/236* (2017.08); *B29C 64/307* (2017.08); *B41J 3/4073* (2013.01); *B33Y 10/00* (2014.12); *B33Y 30/00* (2014.12); *B33Y 40/00* (2014.12)

(58) Field of Classification Search
CPC ..... B29C 64/236; B29C 64/307; B29C 64/20; B29C 64/245; B29C 64/25; B29C 64/282; B41J 3/4073; B41J 3/28; B41J 11/663; B33Y 10/00; B33Y 30/00; B33Y 40/00; B33Y 40/10; B33Y 40/20
See application file for complete search history.

(56) References Cited

U.S. PATENT DOCUMENTS

| | | | |
|---|---|---|---|
| 2011/0235069 A1* | 9/2011 | Otsuka | B41J 13/0045 |
| | | | 358/1.8 |
| 2018/0186068 A1* | 7/2018 | MacCormack | B29C 64/188 |
| 2020/0171748 A1* | 6/2020 | Dong | B29C 64/291 |

FOREIGN PATENT DOCUMENTS

| | | | | |
|---|---|---|---|---|
| CN | 107031051 A | * | 8/2017 | ........... B29C 64/241 |
| CN | 107553687 | | 1/2018 | |
| CN | 107848221 | | 3/2018 | |
| CN | 108621417 | | 10/2018 | |
| CN | 110116565 | | 8/2019 | |
| CN | 110435140 | | 11/2019 | |
| DE | 102016102217 A1 | * | 8/2017 | |
| JP | 2000177017 | | 6/2000 | |

\* cited by examiner

PAPER-BASED 3D PRINTING DEVICE AND PRINTING METHOD

TECHNICAL FIELD

The present disclosure relates to the technical field of 3D printing apparatus, in particular to a paper-based 3D printing device and a printing method.

BACKGROUND ART

Paper-based color 3D printing technology is mainly based on conventional paper sheets (usually A4 paper) and water-based glue. This printing method makes colors of a model not limited to colors of raw material, and realizes a full-color output of 3D printing. Paper-based color 3D printing can achieve high-precision color reproduction and fine gradient color. Paper-based color 3D printing also has industrial advantages such as light weight, being environmentally friendly and low cost, as well as broad application prospects.

When an existing paper-based 3D printing device is printing, a layered color model is printed and colored layer by layer with a printer. Take printing a blue cylinder model as an example, assumed that a height of the blue cylinder is H, after making a model figure through a software, a slicing process is performed for the model figure. Upon calculation, the total number of paper sheets required is n, the printer is configured to print n paper sheets one by one. A printed pattern is a circle filled with blue, and a contour of a predetermined model is a circle. The printed paper sheets are placed on the printing platform one by one. A three-axis linkage platform is used to drive a cutting head to cut a first printed paper sheet along a contour of the predetermined model. After the first printed paper sheet is cut, glue is applied onto the first paper sheet, and then another printed paper sheet is located onto the first paper sheet to be glued and formed. Furthermore, the another printed paper sheet is cut, the above operation is repeated until all the printed paper sheets are cut and glued to form integrally. Finally, waste paper edges are peeled off so as to form a complete color 3D model.

Because layer-by-layer coloring does not make all fibers within paper sheets completely adhered by ink, that is, the ink cannot penetrate through an entire thickness of paper sheets, so that an outer surface of the model has portions which are not colored and white paper is exposed, when the model is separated from the waste paper edges, thus a color reproduction effect is greatly reduced. Furthermore, since the ink printed on a paper surface is finally adhered to an inside of the model, it cannot be displayed, thereby greatly wasting the ink. In addition, the paper-based 3D printing process which colors paper sheets layer by layer and bonds the cut paper sheets layer by layer is relatively cumbersome, making an overall printing speed extremely slow and printing efficiency low.

SUMMARY

A first object of some embodiments is to provide a paper-based 3D printing device to solve a technical problem in the prior art of: an outer surface of a model having some portions uncolored and wasting ink.

A second objective of the present disclosure is to provide a paper-based 3D printing method to solve a technical problem in the prior art of: low printing efficiency, more wasting ink and an outer surface of a printed model having some portions uncolored.

Based on the above-mentioned first objective, the present disclosure provides a paper-based 3D printing device, including a printing platform, a three-axis linkage platform, a cutting head, and an inkjet head. Paper sheet are placed on the printing platform. The three-axis linkage platform is configured to first drive the cutting head to cut a paper sheet along a corresponding contour of a predetermined model, so as to form a cutting seam, and then drive the inkjet head to eject ink toward the cutting seam along the contour of the predetermined model to color.

Further, in some embodiments, the paper-based 3D printing device further includes a shell. The printing platform, the three-axis linkage platform, the cutting head and the inkjet head are all located in the shell, in which the three-axis linkage platform is installed on a bottom plate of the shell.

Further, in some embodiments, the paper-based 3D printing device further includes an ink cartridge, and the ink cartridge is connected to the inkjet head through an ink feeding tube.

Further, in some embodiments, the ink in the ink cartridge is UV ink; two opposite side walls of the shell are respectively provided with a UV lamp set.

Further, in some embodiments, the paper-based 3D printing device further includes a drag chain. The drag chain is made of a light-shielding material, and the ink feeding tube is located inside the drag chain.

Further, in some embodiments, the paper-based 3D printing device further includes a waste ink cartridge and a cleaning tube. The waste ink cartridge is provided with an inlet and an outlet. A first end of the cleaning tube is communicated with the inlet of the waste ink cartridge, and a second end of the cleaning tube is communicated with the inkjet head. The outlet of the waste ink cartridge is connected with a waste liquid container.

Further, in some embodiments, the three-axis linkage platform includes an X-axis driving device, a Y-axis driving device, and a Z-axis driving device. The printing platform is mounted on the Z-axis driving device. The Z-axis driving is used to drive the printing platform to raise and lower. The cutting head and the inkjet head are both installed on the X-axis driving device. The X-axis driving device is used to drive the cutting head and the inkjet head to reciprocate along the X-axis direction. The X-axis driving device is connected to the Y-axis driving device. The Y-axis driving device is installed above the printing platform. The Y-axis driving device is used to drive the cutting head and the inkjet head to reciprocate along the Y axis.

Further, in some embodiments, the cutting head includes a mounting seat and a blade. The blade is connected to a lower end of the mounting seat. The blade is triangular.

Further, in some embodiments, the paper-based 3D printing device further includes a glue moving mechanism. The glue moving mechanism is connected to the three-axis linkage platform.

Further, in some embodiments, the glue moving mechanism includes a driving mechanism, a glue bin, a glue applying disc, and a glue feeding tube. The driving mechanism and the glue bin are both installed on the three-axis linkage platform. The driving mechanism is drive-connected with the glue applying disc to drive the glue applying disc to rotate around an axis of the glue applying disc. A circumferential surface of the glue applying disc is provided with a plurality of grooves at intervals. A first end of the glue feeding tube is communicated with a glue storage container, and a second end of the glue feeding tube is communicated with an inlet of the glue bin. An outlet of the glue bin is located above the glue applying disc, so that glue flowing out of the outlet of the glue bin can enter the groove. The three-axis linkage platform can drive the glue applying disc to roll on a paper surface.

Based on the above second objective, the present disclosure also provides a paper-based 3D printing method, including the following steps:

cutting step, in which the cutting head cuts a paper sheet along a corresponding contour of a predetermined model to form a cutting seam;

coloring step, in which the inkjet head ejects ink toward the cutting seam along the contour of the predetermined model to color.

Optionally, in some embodiments, the method further includes: before the cutting step, making a model figure according to a paper-based 3D model to be printed, and performing a slicing process on the model figure so as to obtain the total number of paper sheets required for the paper-based 3D model to be printed and contours of a predetermined model corresponding to respective paper sheets.

Optionally, in some embodiments, the method further includes: after the coloring step, peeling off waste paper edges to obtain a paper-based 3D model.

Compared with the prior art, the present disclosure has the following beneficial effects.

The paper-based 3D printing device provided by the present disclosure includes a printing platform, a three-axis linkage platform, a cutting head, and an inkjet head. The printing platform is configured to place paper sheets thereon. The three-axis linkage platform is configured to first drive the cutting head to cut a paper sheet along a corresponding contour of a predetermined model to form a cutting seam, and then drives the inkjet head to eject ink toward the cutting seam along the contour of the predetermined model to color.

With respect to the paper-based 3D printing device provided by the present disclosure, when in use, paper sheets are placed on the printing platform. A first paper sheet is placed first, then the three-axis linkage platform first drives the cutting head to cut the first paper sheet along a contour of a predetermined model to form a cutting seam, and next drives the inkjet head to eject ink toward the cutting seam along the contour of the predetermined model to color. This method not only saves ink, but the ink is ejected directly to the cutting seam, which is equivalent to coloring an outer surface of the model. The method improves coloring effect effectively, allows an outer surface of the model to be colored uniformly. After the first paper sheet is colored, a second paper sheet is placed on the printing platform. The second paper sheet is cut and colored, and the above operation is repeated, until a complete 3D model is formed.

The paper-based 3D printing method provided by the present disclosure is applied to the above-mentioned paper-based 3D printing device, and the method includes cutting step and coloring step.

In the cutting step, the cutting head cuts a corresponding paper sheet along a contour of a predetermined model to form a cutting seam.

In the coloring step, the inkjet head ejects ink toward the cutting seam along the contour of the predetermined model to color.

The paper-based 3D printing method provided by the present disclosure not only saves ink, but also can eject ink directly onto the cutting seam, which is equivalent to coloring an outer surface of a model. The method improves coloring effect effectively, allows an outer surface of the model to be colored uniformly, eliminates a step of printing paper one by one, and haves a high printing efficiency.

BRIEF DESCRIPTION OF THE DRAWINGS

In order to more clearly illustrate the specific embodiments of the present disclosure or the technical solutions in the prior art, the drawings that need to be used in the specific embodiments or the description of the prior art are now briefly described. Obviously, the drawings in the following description are some embodiments of the present disclosure. For those of ordinary skill in the art, other drawings can be obtained based on these drawings without creative work.

List of reference numbers: 101 printing platform; 102 cutting head; 103 inkjet head; 104 glue feeding tube; 105 glue bin; 106 glue applying disc; 107 driving mechanism; 108 glue storage container; 109 mounting seat; 110 blade; 111 shell; 112 ink cartridge; 113 UV lamp set; 114 heat emission hole; 115 drag chain; 116 waste ink cartridge; 117 inlet; 118 outlet; 119 Z-axis lead screw; 120 Z-axis motor; 121 Y-axis lead screw; 122-Y-axis motor; 123 transmission shaft; 124 X-axis lead screw; 125 bottom plate; 126 glue moving mechanism; 127 groove.

DETAILED DESCRIPTION OF THE EMBODIMENTS

The technical solutions of the present disclosure will be clearly and completely described below in conjunction with embodiments. Apparently, the described embodiments are a part of the embodiments of the present disclosure, but not all of the embodiments. Based on the embodiments of the present disclosure, all other embodiments obtained by those of ordinary skill in the art without creative work shall fall within a protection scope of the present disclosure.

Embodiment 1

Referring to FIGS. 1-9, this embodiment provides a paper-based 3D printing device, including a printing platform 101, a three-axis linkage platform, a cutting head 102 and an inkjet head 103. The printing platform 101 is configured to place paper sheets thereon. The three-axis linkage platform is configured to first drive the cutting head 102 to cut a paper sheet along a corresponding contour of a predetermined model to form a cutting seam, and then drive the inkjet head 103 to eject ink toward the cutting seam along the contour of the predetermined model to color.

In the paper-based 3D printing device provided in this embodiment, when in use, paper sheets are placed on the printing platform 101. A first sheet of paper is placed first, then the three-axis linkage platform first drives the cutting head 102 to cut the first sheet of paper along a contour of a predetermined model to form a cutting seam, and next drives the inkjet head 103 to eject ink toward the cutting seam along the contour of the predetermined model to color. This method not only saves ink, but also ejects ink directly to the cutting seam, which is equivalent to coloring an outer surface of the model, and thus the method effectively improves coloring effect, and allows an outer surface of the model to be uniformly colored. After the first sheet of paper is colored, a second sheet of paper is placed for cutting and coloring, and the above operation is repeated until a complete 3D model is formed.

Figure 9:
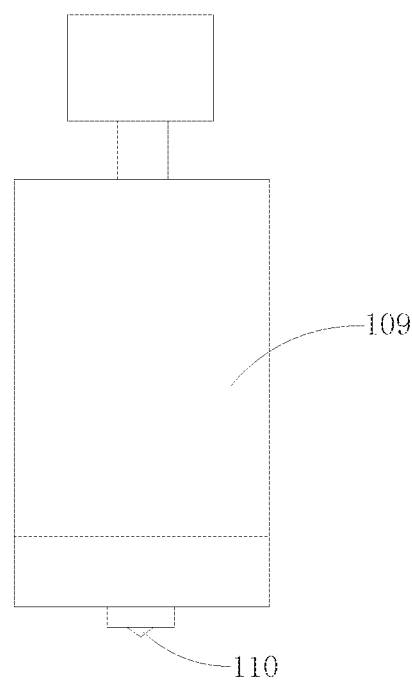
FIG. 9 is a structural schematic diagram of the cutting head in the paper-based 3D printing device according to Embodiment 1 of the present disclosure.

In some embodiments, referring to FIG. 9, the cutting head includes a mounting seat 109 and a blade 110. The blade 110 is connected to a lower end of the mounting seat 109. The blade 110 is triangular.

In some embodiments, the paper-based 3D printing device further includes a glue moving mechanism 126. The glue moving mechanism 126 is connected to the three-axis linkage platform. The three-axis linkage platform drives the glue moving mechanism 126 to move to apply glue on a paper sheet which has been cut and colored. Another paper sheet is placed on the paper sheet applied with glue and is glued thereon, and then the three-axis linkage platform continues to drive the cutting head 102 to cut the another paper sheet along a contour of a predetermined model, and drives the inkjet head 103 to eject ink toward the cutting seam along the contour of the predetermined model to color.

Figure 5:
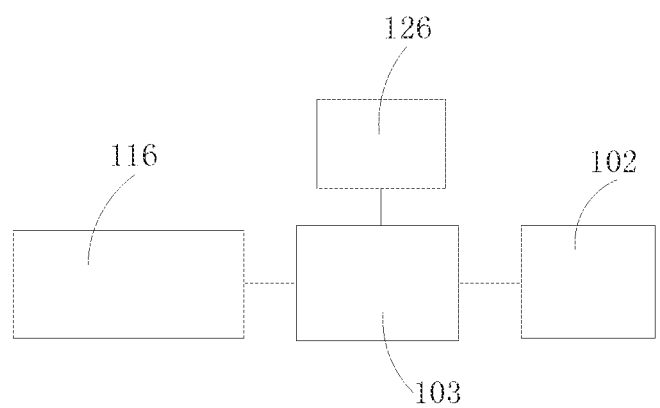
FIG. 5 is a schematic diagram showing one positional relationship among an inkjet head, a cutting head, a waste ink cartridge and the glue moving mechanism in the paper-based 3D printing device according to Embodiment 1 of the present disclosure (a top view)

As shown in FIG. 5, the glue moving mechanism 126 is located behind the inkjet head 103, thereby enabling space to be utilized reasonably.

Figure 6:
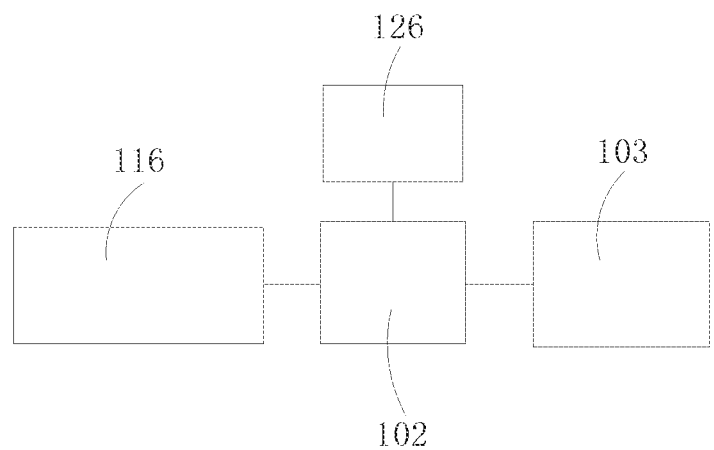
FIG. 6 is a schematic diagram showing another positional relationship among the inkjet head, the cutting head, the waste ink cartridge and the glue moving mechanism in the paper-based 3D printing device according to Embodiment 1 of the present disclosure (a top view)

It should be noted that a positional relationship between the glue moving mechanism 126 and the inkjet head 103 and a positional relationship between the cutting head 102 and the inkjet head 103 are not limited to the above mentioned, and can also be arranged reasonably as desired, for example seeing a form shown in FIG. 6.

Figure 3:
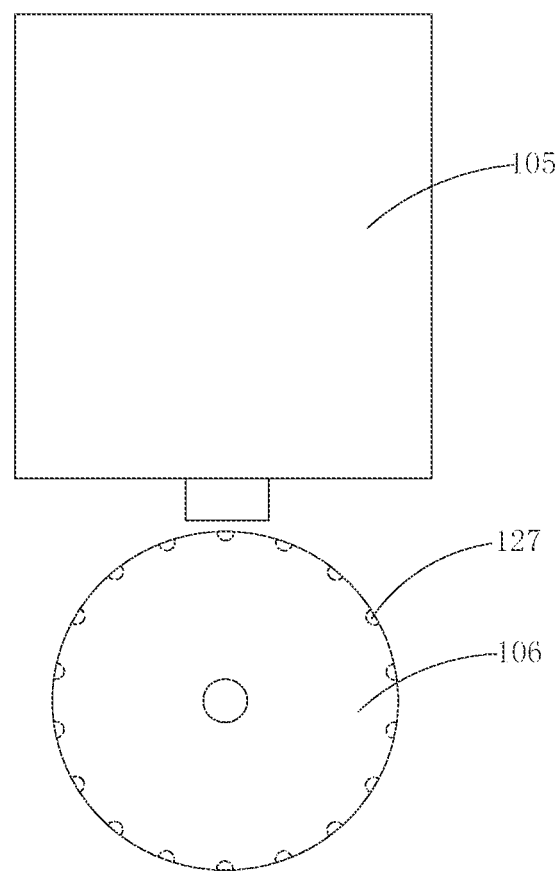
FIG. 3 is a front view of a glue moving mechanism in the paper-based 3D printing device according to Embodiment 1 of the present disclosure.
Figure 4:
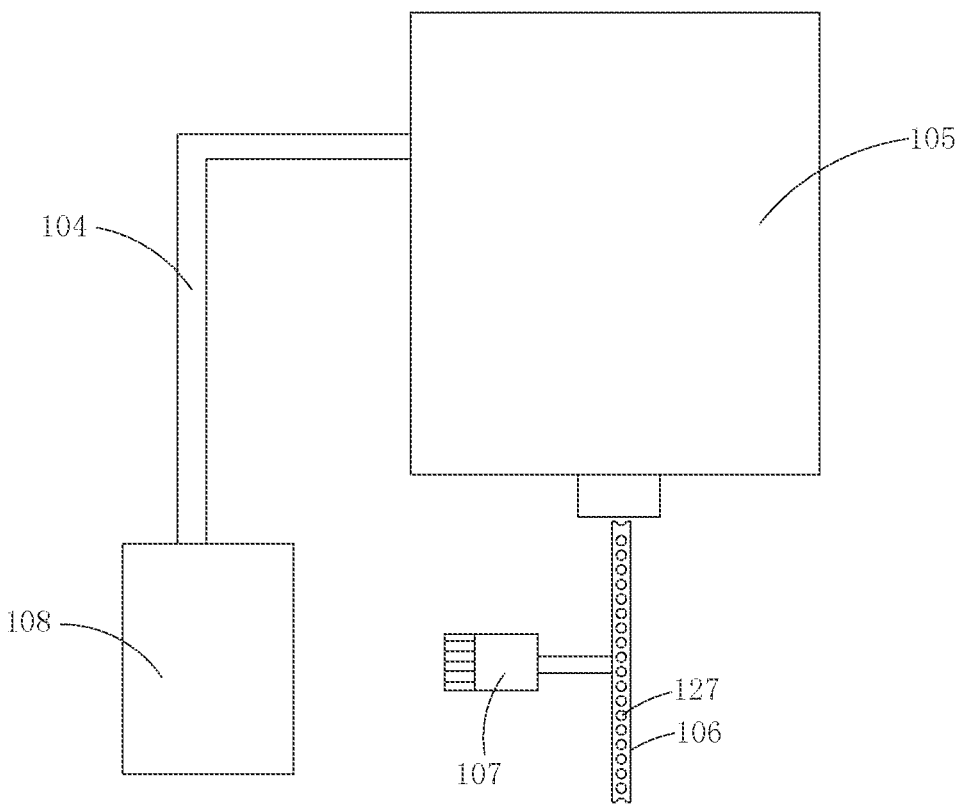
FIG. 4 is a left side view of the glue moving mechanism in the paper-based 3D printing device according to Embodiment 1 of the present disclosure.

Referring to FIG. 3 and FIG. 4, the glue moving mechanism 126 includes a glue feeding tube 104, a glue bin 105, a glue applying disc 106 and a driving mechanism 107. A first end of the glue feeding tube 104 is communicated with a glue storage container 108, and a second end of the glue feeding tube 104 is communicated with an inlet 117 of the glue bin 105. Glue in the glue storage container 108 can be delivered to the glue bin 105 through a feeding pump (not shown). An outlet of the glue bin 105 is located above the glue applying disc 106. A circumferential surface of the glue applying disc 106 is provided with a plurality of grooves 127 at intervals. The driving mechanism 107 is drive-connected with the glue applying disc 106 to drive the glue applying disc 106 to rotate around an axis of the glue applying disc 106, so as to drive the glue applying disc 106 to roll on a surface of the paper sheet. Glue flowing out from the outlet of the glue bin 105 enters into the grooves 127. As the glue applying disc 106 rolls on the paper surface, the glue in the grooves 127 and the glue on the circumferential surface of the glue applying disc 106 can be applied on the paper surface.

A size of the outlet of the glue bin 105 is not greater than a size of each groove 127, so as to allow glue flowing out of the outlet of the glue bin 105 to enter into the grooves 127 or flow onto the circumferential surface of the glue applying disc 106, and not flow down along a surface of the glue applying disc 106, thereby ensuring a good glue-applying effect.

Optionally, the outlet of the glue bin 105 is provided with a valve, such as a solenoid valve.

In this embodiment, the groove 127 is a spherical groove, and the spherical grooves are evenly arranged and spaced apart along the circumferential surface of the glue applying disc 106. By providing the spherical grooves, it is convenient to clean the glue applying disc 106 to avoid dead corners that are difficult to clean.

It should be noted that the groove 127 may also be a groove of other shapes.

It should be noted that the glue used is the same as that used in current common paper-based 3D printing devices, such as water-based glue.

In some embodiments, the paper-based 3D printing device further includes a paper storage bin and a paper transfer gripper. Before printing, all paper sheets required for a paper-based 3D model to be printed are placed in the paper storage bin. The paper transfer gripper picks up one paper sheet from the paper storage bin and places it onto the printing platform 101; next this paper sheet is cut, colored and applied with glue. Furthermore, the paper transfer gripper picks up a next paper sheet and places it on the printing platform 101, and then the next paper sheet is cut, colored and applied with glue, and the above operation is repeated, until a complete 3D model is formed.

It should be noted that the paper storage bin and the paper transfer gripper in this embodiment have the same structure as that in the current common paper-based 3D printing device, and they will not be described in detail here.

Figure 1:
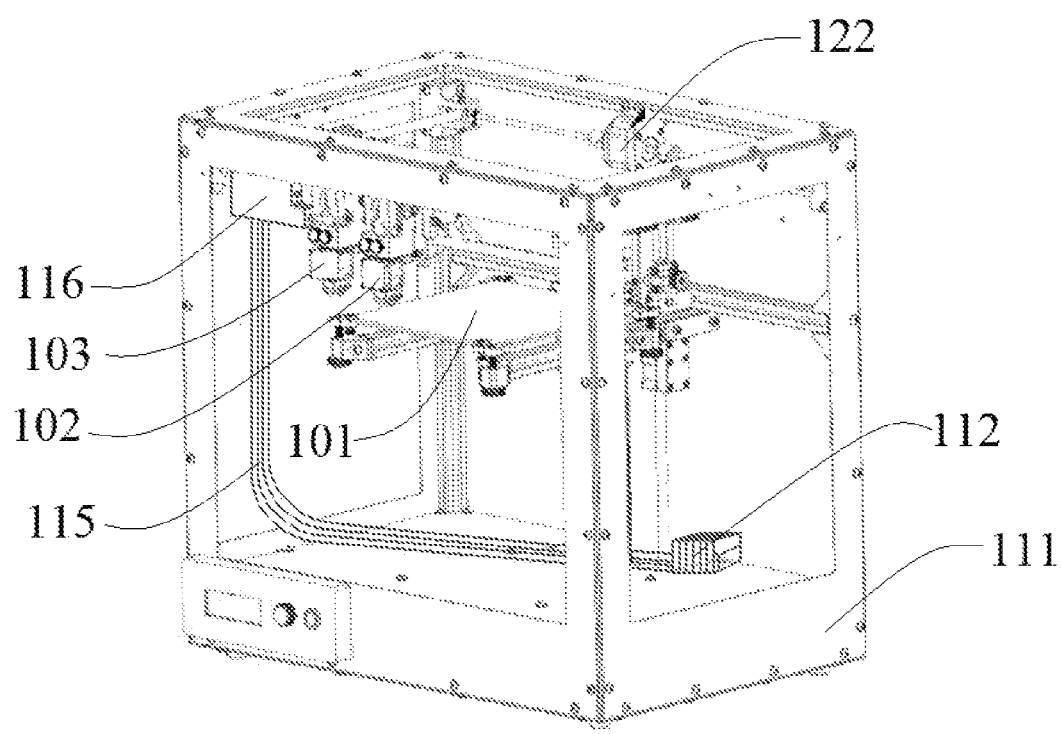
FIG. 1 is a structural schematic diagram of a paper-based 3D printing device according to Embodiment 1 of the present disclosure.
Figure 7:
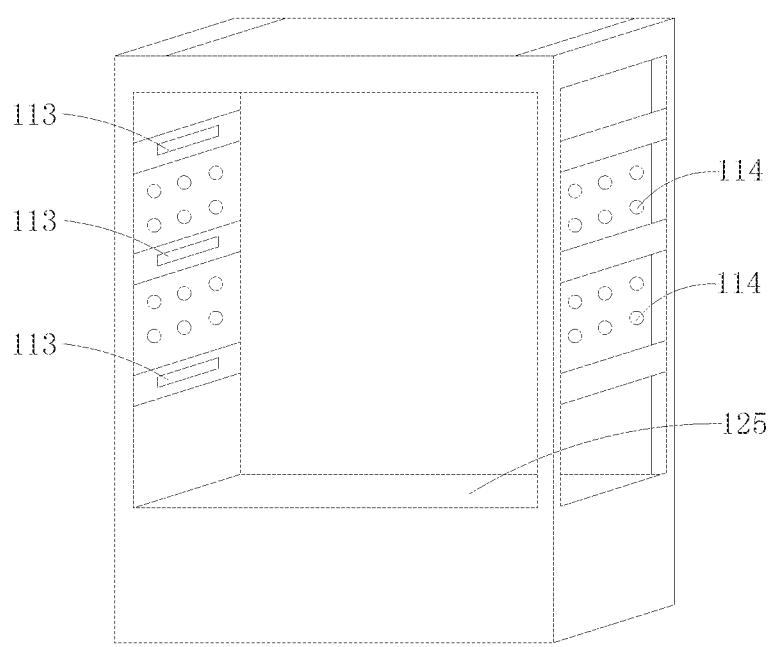
FIG. 7 is a structural schematic diagram of the shell in the paper-based 3D printing device according to Embodiment 1 of the present disclosure.
Figure 8:
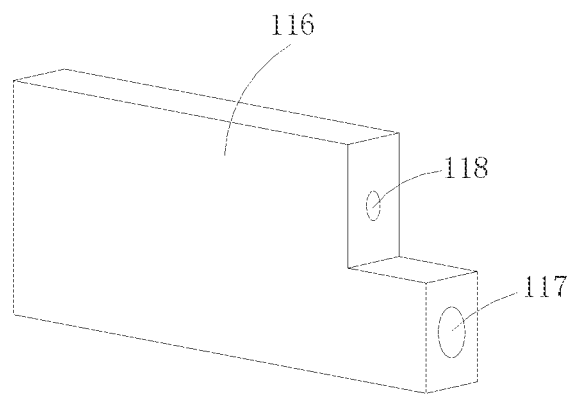
FIG. 8 is a structural schematic diagram of the waste ink cartridge in a paper-based 3D printing device according to Embodiment 1 of the present disclosure.

Referring to FIG. 1 and FIG. 7, in order to clearly show an internal structure, FIG. 1 does not show a side plate of the shell. In some embodiments, the paper-based 3D printing device further includes a shell 111. The printing platform 101, the three-axis linkage platform, the cutting head 102 and the inkjet head 103 are all located inside the shell 111, in which the three-axis linkage platform is installed on a bottom plate 125 of the shell 111.

In order to ensure that a printing process is performed in a relatively closed environment, a shell 111 is usually provided, which has a view window provided on the side wall thereof to facilitate observation of a printing situation.

The glue bin 105 and the driving mechanism 107 are fixedly installed inside the shell 111. The paper storage bin and the paper transfer gripper are also fixedly installed inside the shell 111.

The inkjet head 103 in this embodiment can be an inkjet head in a current common digital printer, such as the inkjet head in EPSONSTYLUS PRO 7600.

In some embodiments, referring to FIG. 1, the paper-based 3D printing device further includes an ink cartridge 112, and the ink cartridge 112 is connected to the inkjet head 103 through an ink feeding tube.

Optionally, the ink cartridge 112 is installed on a bottom plate 125 of the shell 111.

In this embodiment, the ink cartridge 112 is a six-color ink cartridge, including black, cyan, magenta, yellow, light cyan, and spot colors, so that color effects with more gradations can be reproduced. Correspondingly, the number of ink feeding tubes is six, and for each color, one ink feeding tube is specialized for an ink of such color and cannot be mixedly used with another feeding tube.

It should be noted that the ink cartridge 112 is not limited to a six-color ink cartridge and colors are not limited to the above six colors, and they can be selected according to actual printing requirements.

In some embodiments, the ink in the ink cartridge 112 is UV ink. Two opposite side walls of the shell 111 are respectively provided with UV lamp sets 113.

UV (ultraviolet curing) ink refers to an ink in which under ultraviolet irradiation, monomers in an ink binder are polymerized into a polymer by using ultraviolet light of different wavelengths and energy, so that the ink is filmed and dried. UV ink also belongs to ink, which not only has bright colors (except special cases), good printability and suitable curing and drying rate, but also has good adhesion, and has characteristics of wear resistance, corrosion resistance, weather resistance and so on.

In this embodiment, UV ink is used. When the UV ink penetrates into a cutting seam, it can be dried quickly, which ensures that color on an outer surface of the model has a high glossiness and a good color rendering effect.

In this embodiment, two opposite side walls of the shell 111 are respectively provided with UV lamp sets 113. Specifically, as shown in FIG. 7, each side wall is provided with three UV lamp sets 113. Three UV lamps sets 113 are arranged at intervals along a height direction of the shell 111. The UV lamp sets 113 on the two side walls align with each other in a horizontal direction.

As the printing process proceeds, more and more paper sheets are stacked on the printing platform 101. Three UV lamp sets 113 can be arranged evenly and at intervals along a height direction of the shell 111, so that the UV ink at different positions of the entire model can be evenly illuminated to achieve a best color rendering effect.

The UV lamp set 113 in this embodiment includes one or more ultraviolet lamp tubes.

It should be noted that the number of UV lamp sets 113 is not limited to three. Arrangement of the UV lamp sets 113 is not limited to the above mentioned, and can also be reasonably designed according to an overall size of the paper-based 3D printing device.

In some embodiments, referring to FIG. 1, the paper-based 3D printing device further includes a drag chain 115. The drag chain 115 is made of light-shielding material. The ink feeding tube is located inside the drag chain 115.

By providing the drag chain 115, it is convenient for the ink feeding tube to move with movement of the inkjet head 103.

In addition, electric wires in the paper-based 3D printing device are also located inside the drag chain 115.

Each ink feeding tube and the electric wire are evenly spaced apart and arranged side by side in the drag chain 115, which is convenient for fault diagnosis during operation and targeted maintenance.

The drag chain 115 can be made of black resin material with strong toughness, so that the entire paper-based 3D printing device can be flexibly stretched and moved in a three-dimensional space, and the delivered UV ink is protected from being influenced by external illumination factors such as sunlight and fluorescent lamp, thereby ensuring a high precision coloring.

In some embodiments, as shown in FIG. 7, the side wall of the shell 111 is further provided with a heat emission hole 114.

In some embodiments, the paper-based 3D printing device further includes a waste ink cartridge 116 and a cleaning tube. As shown in FIG. 7, the waste ink cartridge 116 is provided with an inlet 117 and an outlet 118. A first end of the cleaning tube is communicated with the inlet 117 of the waste ink cartridge 116. A second end of the cleaning tube is communicated with the inkjet head 103. The outlet 118 of the waste ink cartridge 116 is connected with a waste liquid container.

The inkjet head 103 needs normal maintenance. For this reason, the paper-based 3D printing device is also provided with a cleaning tube and a waste ink cartridge 116. When the inkjet head 103 needs to be cleaned, the inkjet head 103 is communicated with the cleaning tube, and the ink in the ink cartridge 112 is used to flush the inkjet head 103, and the flushed waste ink enters the waste ink cartridge 116 through the cleaning tube. When the waste ink cartridge 116 is full, excessive waste ink may flow to the waste liquid container, so as to prevent the waste ink from overflowing from the outlet 118 to contaminate the printing device.

Referring to FIG. 1, in a possible design of this embodiment, the waste ink cartridge 116 is installed on the three-axis linkage platform. Optionally, the waste ink cartridge 116 is connected to one side of the inkjet head 103 away from the cutting head 102.

Figure 2:
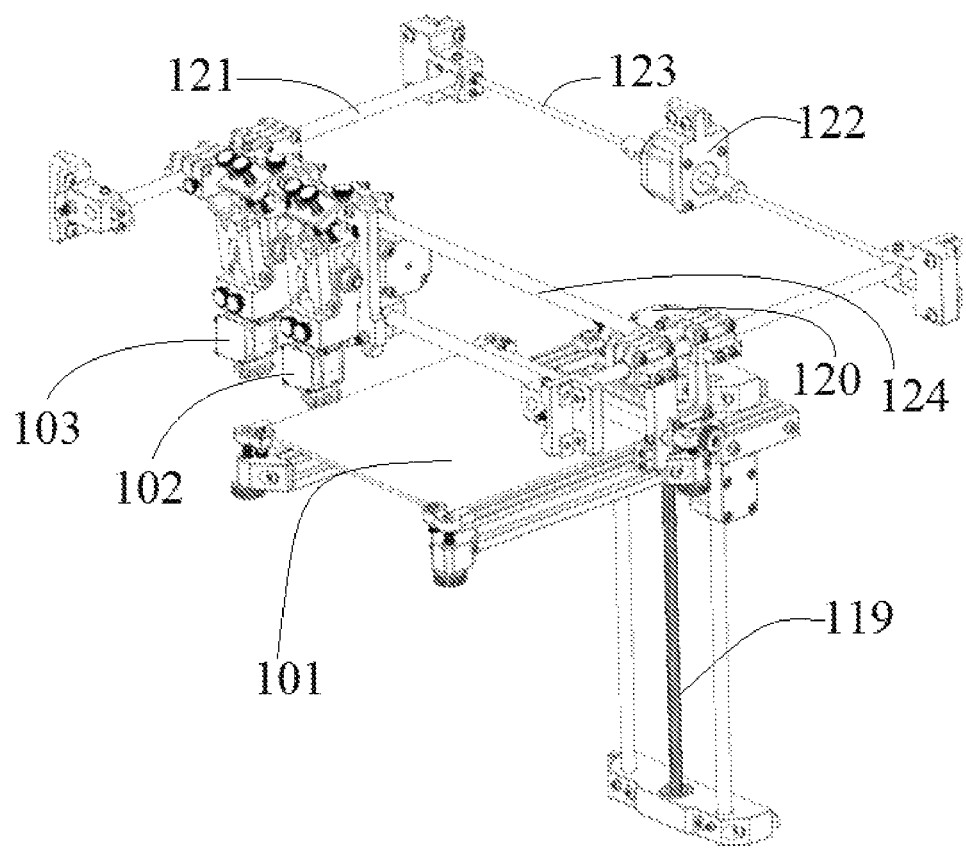
FIG. 2 is a structural schematic diagram of a variant of the paper-based 3D printing device according to Embodiment 1 of the present disclosure, in which a shell is not shown.

As shown in FIG. 2, in another possible design of this embodiment, the waste ink cartridge 116 is arranged on the bottom plate 125 of the shell 111. When the inkjet head 103 needs to be cleaned, the cleaning tube is connected between the inlet 117 of the waste ink cartridge 116 and the inkjet head 103. In such way, the waste ink cartridge 116 does not move along with movement of the inkjet head 103, to prevent the waste ink from overflowing.

In order to clearly show the three-axis linkage platform, FIG. 2 does not show the shell 111, the ink cartridge 112, the drag chain 115 and the waste ink cartridge 116. It should be understood that, in another possible design, the ink feeding tube in the drag chain 115 is directly communicated with the inkjet head 103.

In some embodiments, the paper-based 3D printing device further includes a controller. The three-axis linkage platform, the cutting head 102, the inkjet head 103, the paper transfer gripper, the glue moving mechanism 126 and the UV lamp set 113 are respectively connected with the controller. The controller can control movement of the three-axis linkage platform, control the inkjet head 103 to eject ink, control the paper transfer gripper to pick up paper onto the printing platform 101, control the glue moving mechanism 126 to apply glue on a paper surface, and control the UV lamp set 113 to turn on and off.

In some embodiments, the three-axis linkage platform includes an X-axis driving device, a Y-axis driving device and a Z-axis driving device. The printing platform 101 is detachably mounted on the Z-axis driving device. The Z-axis driving device is used to drive the printing platform 101 to raise or lower. The cutting head 102 and the inkjet head 103 can be detachably mounted on the X-axis driving device. The X-axis driving device is used to drive the cutting head 102 and the inkjet head 103 to reciprocate along the X-axis direction. The X-axis driving device is connected with the Y-axis driving device. The Y-axis driving device is installed above the printing platform 101. The Y-axis driving device is used to drive the cutting head 102 and the inkjet head 103 to reciprocate along the Y-axis direction.

The use of a detachable connection method, such as a fixing method through bolts and nuts, facilitates installing and disassembling the printing platform 101, and facilitates replacement and maintenance of the cutting head 102 and the inkjet head 103.

Specifically, the X-axis driving device, the Y-axis driving device and the Z-axis driving device are respectively connected to the controller. The controller respectively controls movements of the X-axis driving device, the Y-axis driving device and the Z-axis driving device. The Z-axis driving device includes a Z-axis lead screw 119 and a Z-axis motor 120. The printing platform 101 is mounted on the Z-axis lead screw 119. The Z-axis motor 120 drives the Z-axis lead screw 119 to rotate along an axis of the Z-axis lead screw 119 so as to cause the printing platform 101 to raise or lower along a length direction of the Z-axis lead screw 119. The X-axis driving device includes an X-axis lead screw 124 and an X-axis motor. The cutting head 102 and the inkjet head 103 are both mounted on the X-axis lead screw 124. The X-axis motor drives the X-axis lead screw 124 to rotate along an axis of the X-axis lead screw 124 so that the cutting head 102 and the inkjet head 103 reciprocate along an axis of the X-axis lead screw 124. The Y-axis driving device includes a Y-axis motor 122, a transmission shaft 123, and a Y-axis lead screw 121. The Y-axis motor 122 is drive-connected with the Y-axis lead screw 121 through the transmission shaft 123. For example, the transmission shaft 123 and the Y-axis lead screw 121 can be drive-connected through a pair of bevel gears. The X-axis lead screw 124 is mounted on the Y-axis lead screw 121. The X-axis lead screw 124 can reciprocate along an axial direction of the Y-axis lead screw 121, so that the cutting head 102 and the inkjet head 103 reciprocates in the Y-axis direction.

Normally, except for right prisms and cylinders, contours of a predetermined model assigned to respective paper sheets are different. For example, if a model to be printed is a cone, contours of the predetermined model on respective paper sheets are circles with different diameters. The controller controls the X-axis driving device and the Y-axis driving device so that the cutting head 102 cut a paper sheet along a corresponding contour of a predetermined model to form a cutting seam, and the inkjet head 103 ejects ink toward the cutting seam along the contour of the predetermined model to color.

It should be noted that the X-axis motor, Y-axis motor 122 and Z-axis motor 120 are all servo motors.

In addition, it should be noted that the controller in this embodiment is a PLC controller, such as Siemens PLC S7-200. A control program for the controller controlling the three-axis linkage platform in this embodiment can adopt a control program in a current common 3D printer for controlling the three-axis linkage platform, so that the cutting head 102 can cut a paper sheet along a corresponding contour of a predetermined model, the inkjet head 103 ejects ink toward a cutting seam along the contour of the predetermined model to color, a movement path of the inkjet head 103 is substantially the same as a movement path of the cutting head 102.

The three-axis linkage platform can also adopt a common platform in other form, such as a three-axis linkage platform driven by a synchronous belt, as long as movements in three directions of X, Y, and Z can be realized.

Embodiment 2

Figure 10:
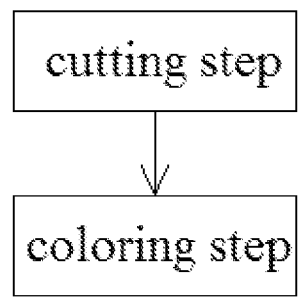
FIG. 10 is a flowchart of a paper-based 3D printing method according to Embodiment 2 of the present disclosure.

Referring to FIG. 10, this embodiment provides a paper-based 3D printing method, which is applied to the paper-based 3D printing device provided in Embodiment 1 of the present disclosure, and the method includes cutting step and coloring step.

In the cutting step, the cutting head 102 cuts a paper sheet along a corresponding contour of a predetermined model to form a cutting seam.

In the coloring step, the inkjet head 103 ejects ink toward the cutting seam along the contour of the predetermined model to color.

The paper-based 3D printing method provided by the embodiment of the present disclosure not only saves ink, but also can eject ink directly to a cutting seam, which is equivalent to coloring an outer surface of a model. The method effectively improves coloring effect, allows an outer surface of the model to be colored uniformly, eliminates a step of printing sheet by sheet and haves a high printing efficiency.

Embodiment 3

Based on Embodiment 2, this embodiment also provides a paper-based 3D printing method, further including: before the cutting step, making a model figure according to a paper-based 3D model to be printed, and performing a slicing process on the model figure so as to obtain the total number of paper sheets required for the paper-based 3D model to be printed and contours of a predetermined model corresponding to respective paper sheets.

In some embodiments, the method further includes: after the coloring step, peeling off waste paper edges to obtain a paper-based 3D model.

Specifically, the paper-based 3D printing method provided in this embodiment includes the following steps.

In step S1, a model figure is made according to a paper-based 3D model to be printed, and a slicing process is performed on the model figure, so as to obtain the total number of sheets required for the paper-based 3D model to be printed and contours of the predetermined model corresponding to respective paper sheet.

In step S2, sheets of required number are put into a paper storage bin.

In step S3, one paper sheet is picked up by a paper transfer gripper and placed onto the printing platform 101.

Optionally, a sheet of white paper can be placed on the printing platform 101 in advance. Four corners of this white paper are fixed with scotch tape. An upper surface of the white paper is applied with glue, and then a first sheet of paper picked up by the paper transfer gripper is glued onto this sheet of white paper, for being ready to print.

In step S4, a cutting head 102 cuts a paper sheet along a corresponding contour of a predetermined model to form a cutting seam.

In step S5, the inkjet head 103 ejects ink toward the cutting seam along the contour of the predetermined model to color.

In step S6, the above steps S3, S4 and S5 are repeated until all paper sheet in the paper storage bin have been processed. In this step, before placing a next paper sheet, it also includes a glue application step, in which glue is applied on an upper surface of the current paper sheet that has been colored, so as to glue the next paper sheet on the current paper sheet placed on the printing platform 101, realizing an adhesive molding.

In step S7, waste paper edges are peeled off to obtain a paper-based 3D model.

Specifically, an entire model without removing the waste paper edges is first removed from the printing platform 101, and then the waste paper edges are peeled off to obtain a paper-based 3D model.

Finally, it should be noted that the above embodiments are only used to illustrate the technical solutions of the present disclosure, but not to limit them. Although the present disclosure has been described in detail with reference to the foregoing embodiments, those of ordinary skill in the art should understand that the technical solutions recorded in the foregoing embodiments can still be modified, or some or all of the technical features can be equivalently replaced. These modifications or replacements do not make essence of the corresponding technical solutions deviate from the technical solutions of the embodiments of the present disclosure.

What is claimed is:

1. A paper-based three-dimensional (3D) printing device, comprising a printing platform, a three-axis linkage platform, a cutting head and an inkjet head; the printing platform is configured to place paper sheets thereon, the three-axis linkage platform is configured to drive the cutting head to cut a paper sheet along a corresponding contour of a predetermined model so as to form a cutting seam, and configured to drive the inkjet head to eject ink toward the cutting seam along the corresponding contour of the predetermined model to color;
   - a shell, wherein the printing platform, the three-axis linkage platform, the cutting head and the inkjet head are all located in the shell, wherein the three-axis linkage platform is installed on a bottom plate of the shell;
   - an ink cartridge, and the ink cartridge is connected to the inkjet head through an ink feeding tube; wherein ink in the ink cartridge is ultraviolet (UV) ink, two opposite side walls of the shell are respectively provided with ultraviolet (UV) lamp sets; and
   - a drag chain, the drag chain is made of a light-shielding material, and the ink feeding tube is located inside the drag chain.

2. The paper-based 3D printing device according to claim 1, further comprises a waste ink cartridge and a cleaning tube, the waste ink cartridge is provided with an inlet and an outlet; a first end of the cleaning tube is communicated with the inlet of the waste ink cartridge, and a second end of the cleaning tube is communicated with the inkjet head; the outlet of the waste ink cartridge is connected with a waste liquid container.

3. The paper-based 3D printing device according to claim 1, wherein the three-axis linkage platform comprises an X-axis driving device, a Y-axis driving device and a Z-axis driving device, the printing platform is mounted on the Z-axis driving device, the Z-axis driving device is used to drive the printing platform to raise or lower; the cutting head and the inkjet head are both installed on the X-axis driving device, the X-axis driving device is used to drive the cutting head and the inkjet head to reciprocate along the X-axis direction, the X-axis driving device is connected to the Y-axis driving device; the Y-axis driving device is installed above the printing platform; the Y-axis driving device is used to drive the cutting head and the inkjet head to reciprocate along the Y axis.

4. The paper-based 3D printing device according to claim 2, wherein the three-axis linkage platform comprises an X-axis driving device, a Y-axis driving device and a Z-axis driving device, the printing platform is mounted on the Z-axis driving device, the Z-axis driving device is used to drive the printing platform to raise or lower; the cutting head and the inkjet head are both installed on the X-axis driving device, the X-axis driving device is used to drive the cutting head and the inkjet head to reciprocate along the X-axis direction, the X-axis driving device is connected to the Y-axis driving device; the Y-axis driving device is installed above the printing platform; the Y-axis driving device is used to drive the cutting head and the inkjet head to reciprocate along the Y axis.

5. The paper-based 3D printing device according to claim 1, wherein the cutting head comprises a mounting seat and a blade, the blade is connected to a lower end of the mounting seat, the blade is triangular.

6. The paper-based 3D printing device according to claim 1, wherein the paper-based 3D printing device further comprises a glue moving mechanism, the glue moving mechanism is connected to the three-axis linkage platform.

7. The paper-based 3D printing device according to claim 6, wherein the glue moving mechanism comprises a driving mechanism, a glue bin, a glue applying disc and a glue feeding tube, the driving mechanism and the glue bin are both installed on the three-axis linkage platform, the driving mechanism is drive-connected with the glue applying disc to drive the glue applying disc to rotate around an axis of the glue applying disc, a circumferential surface of the glue applying disc is provided with a plurality of grooves at intervals, a first end of the glue feeding tube is communicated with a glue storage container, and a second end of the glue feeding tube is communicated with an inlet of the glue bin; an outlet of the glue bin is located above the glue applying disc, so that glue flowing out of the outlet of the glue bin is able to enter the grooves; the three-axis linkage platform drives the glue applying disc to roll on a paper surface.

* * * * *